(12) United States Patent
Song

(10) Patent No.: US 11,480,000 B2
(45) Date of Patent: Oct. 25, 2022

(54) GUIDE BUMPER FOR TAILGATE

(71) Applicants: HYUNDAI MOTOR COMPANY, Seoul (KR); KIA MOTORS CORPORATION, Seoul (KR)

(72) Inventor: Seung Gyu Song, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 502 days.

(21) Appl. No.: 16/451,103

(22) Filed: Jun. 25, 2019

(65) Prior Publication Data

US 2020/0157869 A1     May 21, 2020

(30) Foreign Application Priority Data

Nov. 16, 2018 (KR) .................. 10-2018-0142023

(51) Int. Cl.
| | |
|---|---|
| *E05F 7/04* | (2006.01) |
| *B60J 10/50* | (2016.01) |
| *E05F 5/06* | (2006.01) |
| *E05B 77/38* | (2014.01) |
| *E05B 85/04* | (2014.01) |
| *B60J 5/10* | (2006.01) |
| *B60J 10/84* | (2016.01) |
| *B60J 10/86* | (2016.01) |

(52) U.S. Cl.
CPC .............. *E05F 7/04* (2013.01); *B60J 10/50* (2016.02); *E05B 77/38* (2013.01); *E05B 85/045* (2013.01); *E05F 5/06* (2013.01); *B60J 5/101* (2013.01); *B60J 10/84* (2016.02); *B60J 10/86* (2016.02); *E05Y 2900/546* (2013.01)

(58) Field of Classification Search
CPC .... E05B 85/045; E05B 77/38; E05B 15/0006; E05B 77/36; E05B 81/22; E05B 85/24; E05B 15/022; E05B 85/04; Y10T 292/68; Y10T 292/688; Y10S 292/43; Y10S 292/40; Y10S 292/29; Y10S 292/55; E05Y 2900/546; E05F 7/04; E05F 5/06; B60J 10/50; B60J 10/84; B60J 10/86; B60J 5/10
See application file for complete search history.

(56) References Cited

U.S. PATENT DOCUMENTS

| | | | | |
|---|---|---|---|---|
| 3,743,335 | A * | 7/1973 | Reilhac | ........... E05B 83/24 292/DIG. 43 |
| 4,192,039 | A * | 3/1980 | Haberle | ........... E05F 7/005 292/342 |
| 4,466,645 | A * | 8/1984 | Kobayashi | ........ E05B 77/40 292/216 |

(Continued)

FOREIGN PATENT DOCUMENTS

| | | |
|---|---|---|
| CN | 203296483 U | 11/2013 |
| CN | 105019743 A | 11/2015 |

(Continued)

*Primary Examiner* — Mark A Williams
(74) *Attorney, Agent, or Firm* — McDonnell Boehnen Hulbert & Berghoff LLP

(57) ABSTRACT

Provided is a guide bumper for a tailgate, including a first guide member attached to one of a vehicle body and a tailgate, and a second guide member disposed on the opposite side of the first guide member, the first guide member including at least one outer body and at least one elastic core inserted into the outer body.

8 Claims, 14 Drawing Sheets

(56) References Cited

U.S. PATENT DOCUMENTS

| | | | | | |
|---|---|---|---|---|---|
| 4,981,313 | A | * | 1/1991 | Makamura | E05B 85/045 |
| | | | | | 292/DIG. 56 |
| 5,215,342 | A | * | 6/1993 | Yuge | E05B 85/045 |
| | | | | | 292/DIG. 41 |
| 5,626,384 | A | * | 5/1997 | Walther | E05F 7/04 |
| | | | | | 296/146.1 |
| 5,791,723 | A | * | 8/1998 | Bell | E05F 5/003 |
| | | | | | 16/86 B |
| 6,039,388 | A | * | 3/2000 | Choi | E05F 5/022 |
| | | | | | 267/152 |
| 6,039,389 | A | * | 3/2000 | Monette | E05F 5/022 |
| | | | | | 296/207 |
| 6,042,160 | A | * | 3/2000 | Hamada | E05B 85/045 |
| | | | | | 292/216 |
| 6,206,455 | B1 | * | 3/2001 | Faubert | E05B 15/0006 |
| | | | | | 16/86 B |
| 6,631,933 | B1 | * | 10/2003 | Westerwick | E05B 85/045 |
| | | | | | 292/341.12 |
| 7,025,395 | B2 | * | 4/2006 | Fisher | E05B 15/0006 |
| | | | | | 292/340 |
| 7,029,043 | B2 | * | 4/2006 | Fisher | E05B 15/0006 |
| | | | | | 292/341.13 |
| 8,100,439 | B2 | * | 1/2012 | Gerner | F25D 23/028 |
| | | | | | 292/DIG. 16 |
| 9,091,101 | B2 | * | 7/2015 | Paskonis | E05B 17/0033 |
| 9,316,021 | B2 | * | 4/2016 | Burciaga | E05B 15/0295 |
| 10,323,445 | B2 | * | 6/2019 | Paskonis | E05B 85/045 |
| 11,085,220 | B2 | * | 8/2021 | Han | E05F 5/025 |
| 2001/0010428 | A1 | * | 8/2001 | Franz | E05B 15/029 |
| | | | | | 292/219 |
| 2002/0000727 | A1 | * | 1/2002 | Rass | E05B 85/045 |
| | | | | | 292/216 |
| 2006/0242789 | A1 | * | 11/2006 | Mokashi | E05F 5/022 |
| | | | | | 16/85 |
| 2009/0243311 | A1 | * | 10/2009 | Johnson | E05B 77/38 |
| | | | | | 292/219 |
| 2012/0161455 | A1 | * | 6/2012 | Meyer | E05B 77/38 |
| | | | | | 292/219 |
| 2013/0249220 | A1 | * | 9/2013 | Paskonis | E05B 85/045 |
| | | | | | 292/95 |
| 2013/0285395 | A1 | | 10/2013 | Burciaga et al. | |

FOREIGN PATENT DOCUMENTS

| | | | | | |
|---|---|---|---|---|---|
| DE | | 19649311 C1 | * | 4/1998 | B60J 5/101 |
| JP | | 2009-166525 A | | 7/2009 | |
| KR | | 2008006031 A | * | 1/2008 | B60J 5/10 |

* cited by examiner

GUIDE BUMPER FOR TAILGATE

CROSS REFERENCE TO RELATED APPLICATION

This application is based on and claims the benefit of priority to Korean Patent Application No. 10-2018-0142023, filed on Nov. 16, 2018, in the Korean Intellectual Property Office, the disclosure of which is incorporated herein in its entirety by reference.

TECHNICAL FIELD

The present disclosure relates to a guide bumper for a tailgate, and more particularly, to a guide bumper for a tailgate capable of reliably preventing movement of a tailgate, rattling noise, booming noise, and the like when a vehicle is running in a state in which the tailgate closes a rear opening of a vehicle body.

BACKGROUND

Vehicles, such as hatchbacks, sports utility vehicles (SUVs), Recreational Vehicles (RVs), and vans, may be installed with a tailgate at the rear thereof. The tailgate is a type of back door for accessing a rear cargo space such as a rear storage compartment.

The tailgate may be pivotally mounted on the rear of the vehicle, and may be configured to open and close a rear opening of the vehicle. A latch mechanism may be mounted on the tailgate, and a striker may be mounted on a vehicle body structure. The tailgate may be locked to the rear of the vehicle by coupling of the latch mechanism and the striker in a state in which the tailgate closes the rear opening of the vehicle.

Meanwhile, a guide bumper may be provided between the tailgate and the vehicle body. The guide bumper prevents the movement of the tailgate while the vehicle is running in a state in which the tailgate closes the rear opening of the vehicle body.

The guide bumper may include a first guide member attached to the vehicle body and a second guide member attached to the tailgate, and the first guide member may be made of a material having elasticity, such as rubber. When the tailgate opens or closes the rear opening of the vehicle body, the first guide member and the second guide member may be separated from each other or engaged with each other. When the tailgate closes the rear opening of the vehicle body, the first guide member and the second guide member may be tightly joined or engaged. The first guide member may be elastically pressed (deformed) by a predetermined interference distance between the first guide member and the second guide member so that the first guide member and the second guide member may be tightly joined or engaged. Thus, the movement of the tailgate, rattling noise, and the like may be prevented during the running of the vehicle.

For example, when the interference distance (or the overlap amount) between the first guide member and the second guide member is 1.2±0.5 mm, a design tolerance may be set to ±0.5 mm.

However, in the manufacturing process of vehicles, dispersion in dimensions may occur in various parts of the guide bumper (the dimensions of a mounting part of the vehicle body and a mounting part of the tailgate, the dimensions of the first guide member and the second guide member, assembly tolerances, and the like). Due to such dispersion factors, the actual tolerance of the interference distance may be ±1.8 mm which is outside the design tolerance.

As for existing guide bumpers, when the interference distance (or the overlap amount) between the first guide member and the second guide member is significantly lower than or exceeds the design tolerance, the first guide member and the second guide member may not be tightly joined or engaged. Thus, the existing guide bumper may fail to appropriately regulate the movement of the tailgate during the running of the vehicle. This may cause the generation of excessive rattling noise, booming noise, etc. at the tailgate, and the tailgate may not be smoothly opened and closed.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a guide bumper for a tailgate, allowing a first guide member and a second guide member to be tightly joined or engaged by elastic deformation when the tailgate closes a rear opening of a vehicle body, regardless of dispersion of tolerances, an interference amount between the guide members, and the like.

According to an aspect of the present disclosure, a guide bumper for a tailgate may include: a first guide member attached to one of a vehicle body and a tailgate, and a second guide member disposed on the opposite side of the first guide member, wherein the first guide member includes at least one outer body and at least one elastic core inserted into the outer body.

The elastic core may allow the outer body to deform when the tailgate closes a rear opening of the vehicle body and the first guide member and the second guide member contact each other.

The outer body may include an outer base fixedly mounted on one of the vehicle body and the tailgate, and an outer guide extending from the outer base toward the second guide member.

The elastic core may include an inner base inserted into the outer base, and an inner guide inserted into the outer guide.

The outer guide may intersect at a predetermined angle with respect to the outer base, and the inner guide may intersect at a predetermined angle with respect to the inner base.

The outer body may further include an outer bending portion which is provided to be curved between the outer guide and the outer base, and the elastic core may further include an inner bending portion which is provided to be curved between the inner guide and the inner base.

The outer guide may have a first outer inclined portion which is inclined from the outer base toward the second guide member, a second outer inclined portion which is inclined from the first outer inclined portion at a predetermined angle, and an outer vertical portion which extends from the second outer inclined portion in a vertical direction, and a bottom end of the outer vertical portion and a mounting surface of the vehicle body may be spaced apart from each other by a predetermined distance.

The inner guide may have a first inner inclined portion which is inclined from the inner base toward the second guide member, a second inner inclined portion which is inclined from the first inner inclined portion at a predetermined angle, and an inner vertical portion which extends from the second inner inclined portion in a vertical direction.

The first guide member may further include a striker and a support body supporting the striker, the elastic core may be connected to the support body, and the outer body may cover the elastic core.

The outer body may have a contact member which contacts the second guide member.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
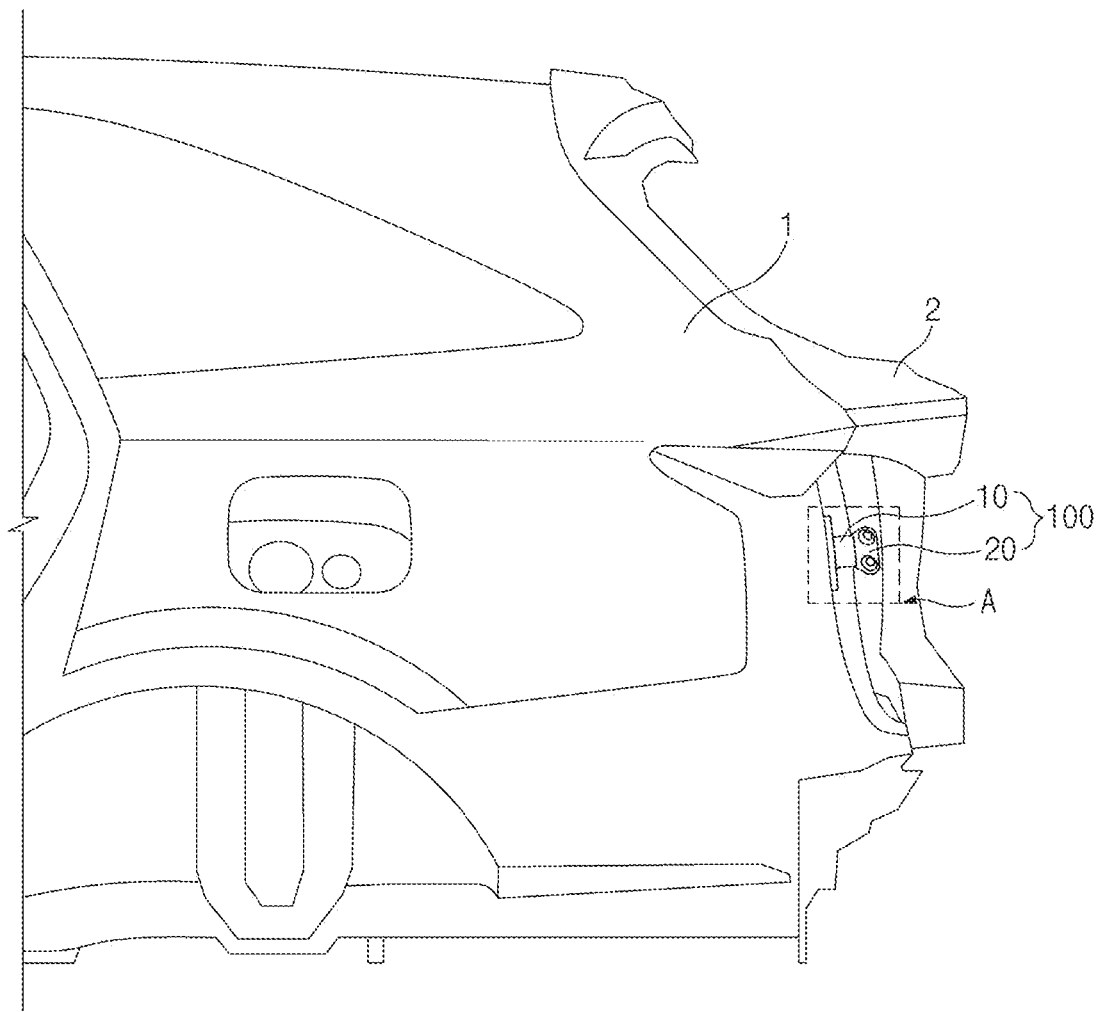
FIG. 1 illustrates a state in which a tailgate closes a rear opening of a vehicle body.
Figure 2:
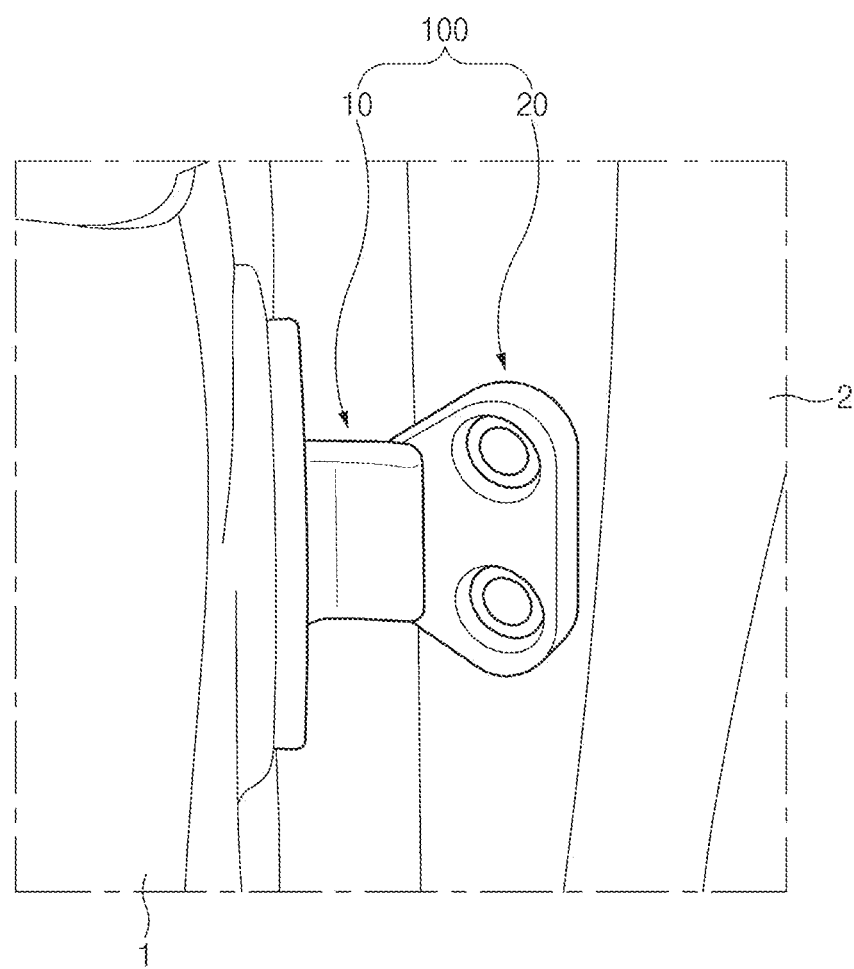
FIG. 2 illustrates an enlarged view of a portion indicated by arrow A in FIG. 1.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIGS. 1 to 9, a guide bumper 100 for a tailgate according to an exemplary embodiment of the present disclosure may include a first guide member 10 attached to one of a vehicle body 1 and a tailgate 2, and a second guide member 20 disposed on the opposite side of the first guide member 10.

According to an exemplary embodiment, as illustrated in FIG. 1, the first guide member 10 may be mounted on a portion of the vehicle body 1 adjacent to an edge of a rear opening of the vehicle body 1, and the second guide member 20 may be mounted on a side surface of the tailgate 2.

According to another exemplary embodiment, the first guide member 10 may be mounted on the tailgate 2, and the second guide member 20 may be mounted on the vehicle body. When the tailgate 2 opens or closes the rear opening of the vehicle body, the first guide member 10 and the second guide member 20 may be separated from each other or engaged with each other.

The first guide member 10 and the second guide member 20 may be disposed to face each other between the tailgate 2 and the rear opening of the vehicle body 1 which is opened and closed by the tailgate 2. When the tailgate 2 closes the rear opening of the vehicle body 1, the first guide member 10 and the second guide member 20 may be tightly joined or engaged to each other.

Figure 3:
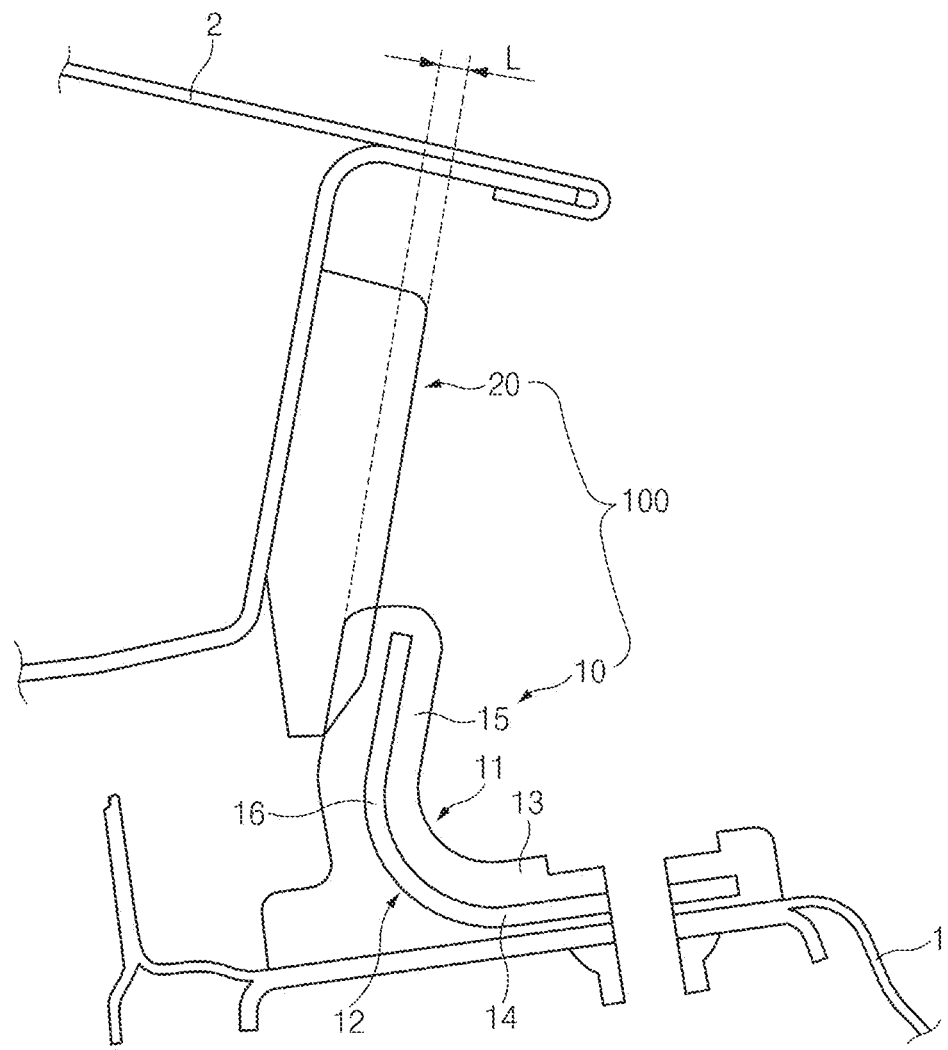
FIG. 3 illustrates a cross-sectional view of a guide bumper for a tailgate according to an exemplary embodiment of the present disclosure.
Figure 4:
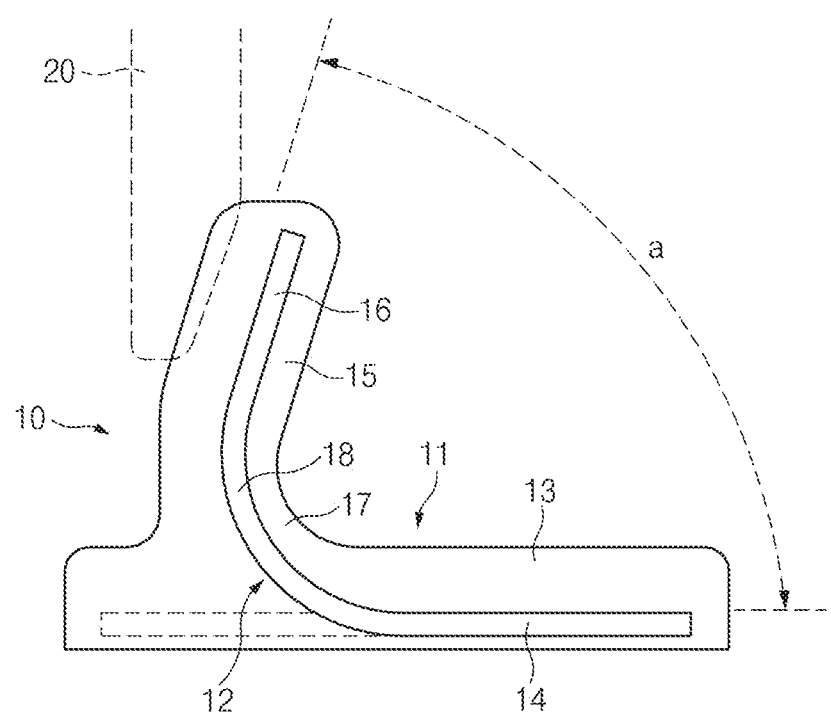
FIG. 4 illustrates a cross-sectional view of a first guide member in a guide bumper for a tailgate according to an exemplary embodiment of the present disclosure.
Figure 5:
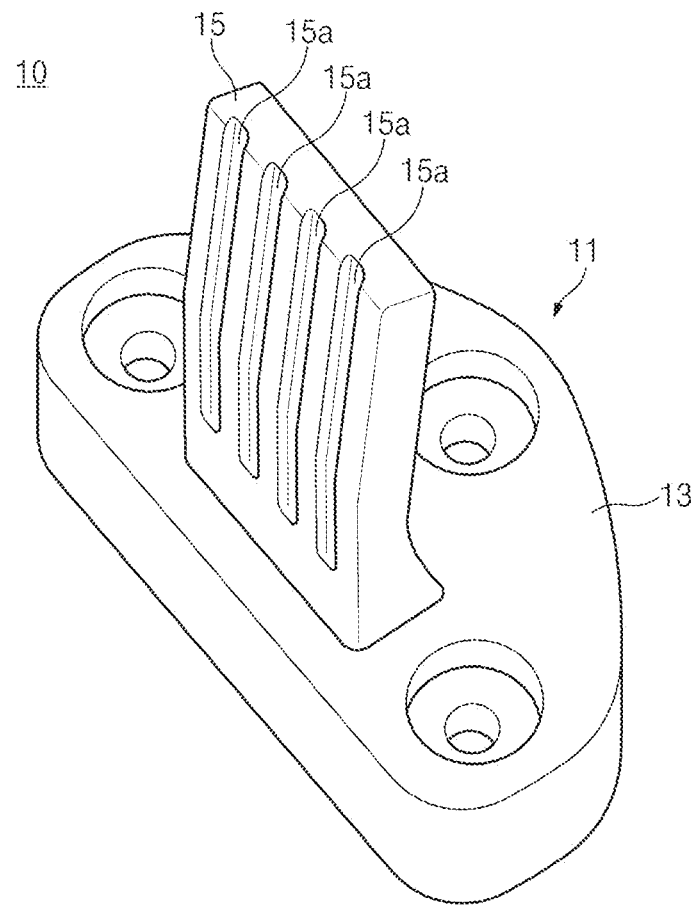
FIG. 5 illustrates a perspective view of a first guide member in a guide bumper for a tailgate according to an exemplary embodiment of the present disclosure.

As illustrated in FIG. 3, when the tailgate 2 closes the rear opening of the vehicle body 1, the first guide member 10 may be deformed by a predetermined interference distance L between the first guide member 10 and the second guide member 20, and thus the first guide member 10 and the second guide member 20 may be tightly joined or engaged.

The first guide member 10 may include an outer body 11 and an elastic core 12 inserted into the outer body 11.

According to an exemplary embodiment of the present disclosure, the elastic core 12 may allow deformation of the outer body 11. When the tailgate 2 closes the rear opening of the vehicle body 1, and the second guide member 20 contacts the first guide member 10, the deformation of the elastic core 12 may allow the outer body 11 to deform in a direction opposite to the second guide member 20, so that tight joining of the first guide member 10 and the second guide member 20 may be sufficiently secured.

Referring to FIGS. 4 to 7, the outer body 11 may be made of an elastically deformable material such as rubber. The outer body 11 may have an outer base 13 mounted on the tailgate 2 or the vehicle body 1, and an outer guide 15 extending from the outer base 13 toward the second guide member 20. The outer guide 15 may intersect at a predetermined angle a with respect to the outer base 13, and the outer guide 15 may be inclined to be close to the outer base 13. An outer bending portion 17 may be provided to be curved between the outer guide 15 and the outer base 13. When the second guide member 20 contacts the first guide member 10, the outer bending portion 17 may facilitate elastic deformation of the outer body 11.

The outer guide 15 may have a plurality of grooves 15a, and each groove 15a may extend in a longitudinal direction of the outer guide 15. The plurality of grooves 15a may be spaced apart from each other in a width direction of the outer guide 15. The outer guide 15 may be deformed more easily by the plurality of grooves 15a.

Referring to FIGS. 4, 5, 8, and 9, the elastic core 12 may be formed of a leaf spring. The elastic core 12 may have an inner base 14 inserted into the outer base 13, and an inner guide 16 inserted into the outer guide 15. The inner base 14 may have the same shape as that of the outer base 13, and the inner guide 16 may have the same shape as that of the outer guide 15. The inner guide 16 may intersect at a predetermined angle a with respect to the inner base 14. In other words, an angle between the inner guide 16 and the inner base 14 may be the same as an angle between the outer guide 15 and the outer base 13. The inner guide 16 may be inclined to be close to the inner base 14. An inner bending portion 18 may be provided to be curved between the inner guide 16 and the inner base 14. When the second guide member 20 contacts the first guide member 10, the inner bending portion 18 may facilitate elastic deformation of the elastic core 12.

Figure 8:
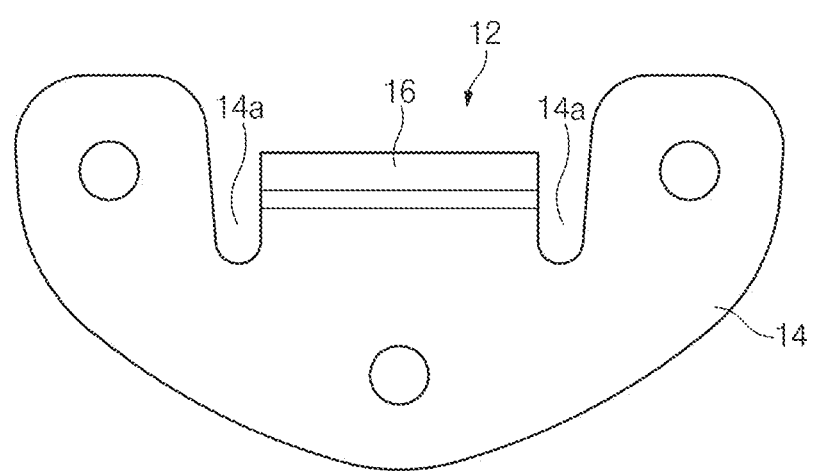
FIG. 8 illustrates a bottom view of an elastic core of a first guide member in a guide bumper for a tailgate according to an exemplary embodiment of the present disclosure.
Figure 9:
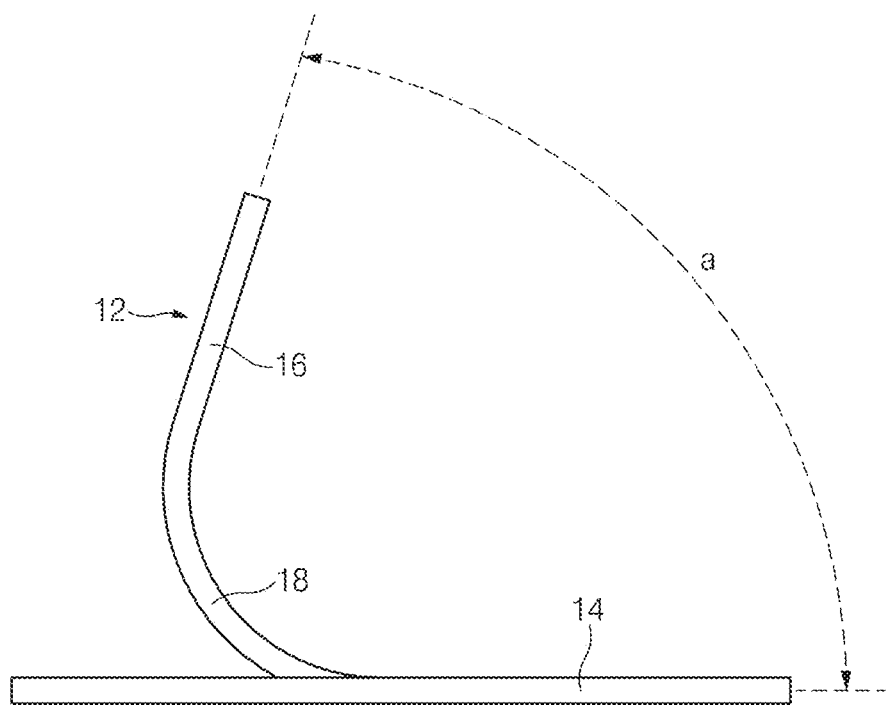
FIG. 9 illustrates a side view of an elastic core of a first guide member in a guide bumper for a tailgate according to an exemplary embodiment of the present disclosure.

Referring to FIG. 8, the inner guide 16 may be bent from the inner base 14 through a pair of cutout grooves 14a.

Figure 6:
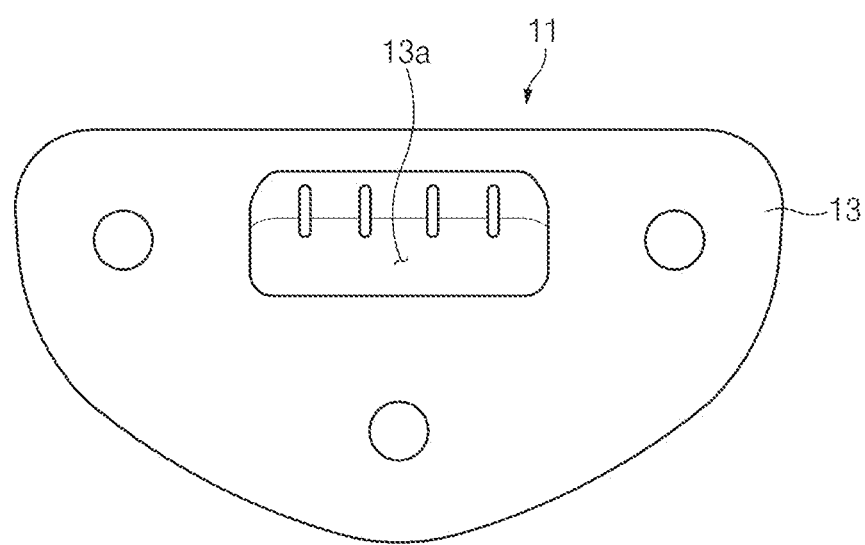
FIG. 6 illustrates a bottom view of an outer body of a first guide member in a guide bumper for a tailgate according to an exemplary embodiment of the present disclosure.
Figure 7:
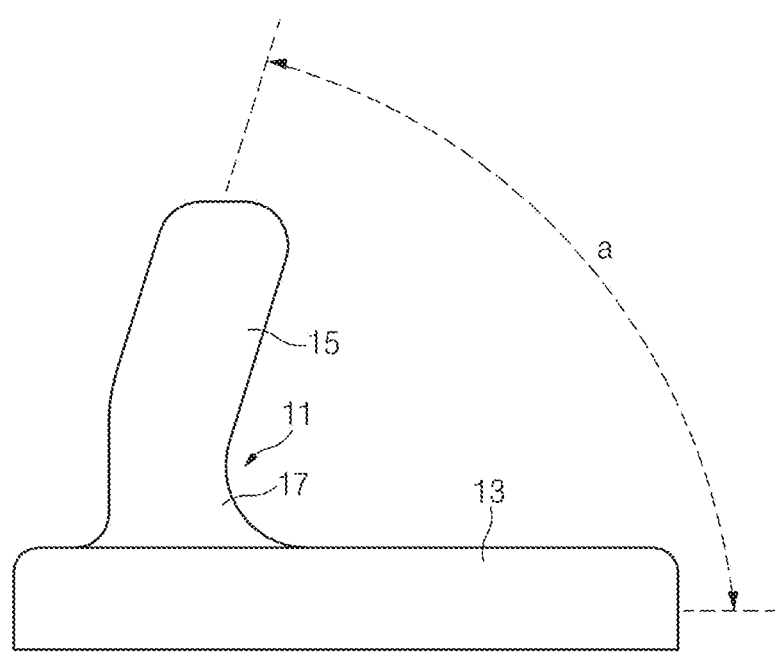
FIG. 7 illustrates a side view of an outer body of a first guide member in a guide bumper for a tailgate according to an exemplary embodiment of the present disclosure.

According to an exemplary embodiment, the outer body 11 may have a receiving space in which the elastic core 12 is received, and an opening 13a which is open into the receiving space, and the opening 13a may be formed in a bottom surface of the outer body 11 as illustrated in FIG. 6. Thus, the elastic core 12 may easily be inserted into the receiving space of the outer body 11 through the opening 13a of the outer body 11.

According to another exemplary embodiment, the outer body 11 and the elastic core 12 may be formed as a single unitary piece by insert casting.

Figure 10:
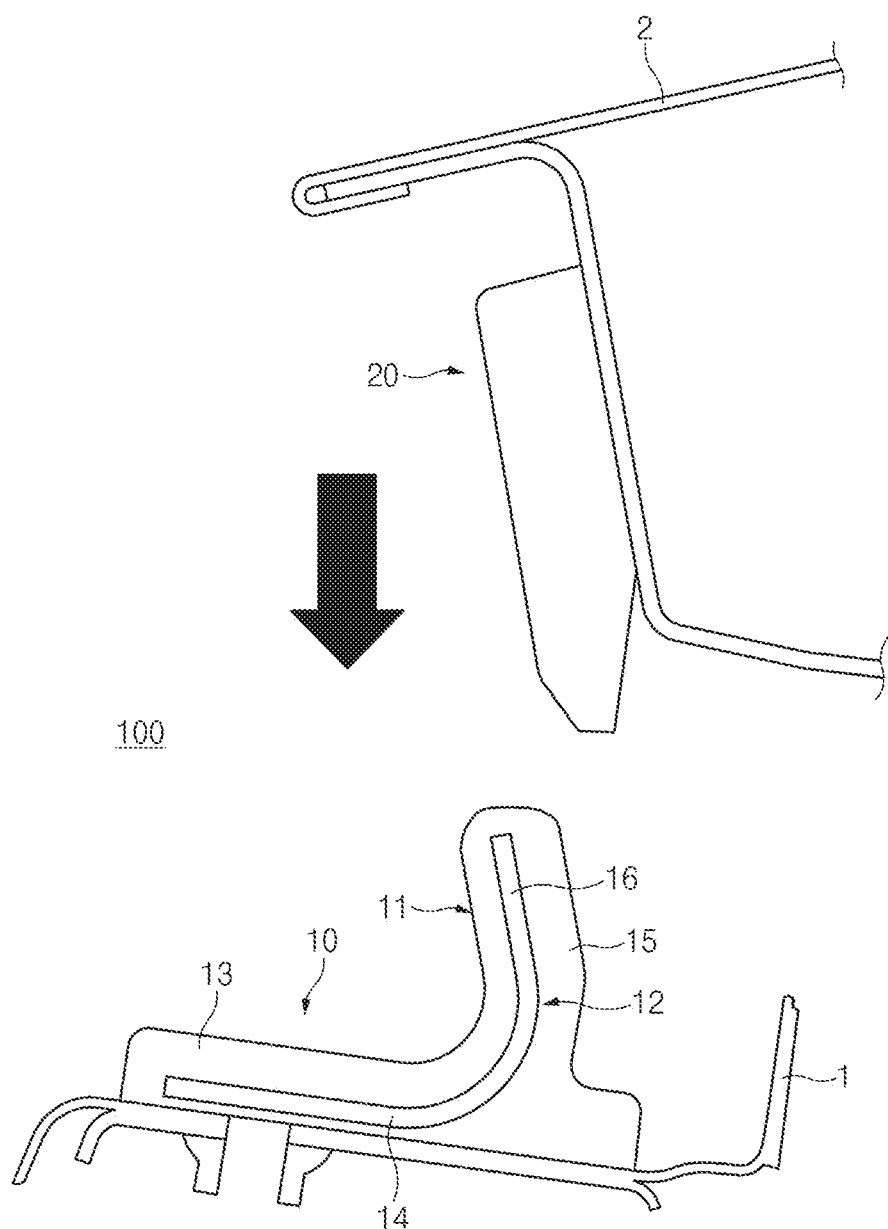
FIG. 10 illustrates a cross-sectional view of a guide bumper for a tailgate according to an exemplary embodiment of the present disclosure, in a state in which a first guide member and a second guide member are separated from each other.
Figure 11:
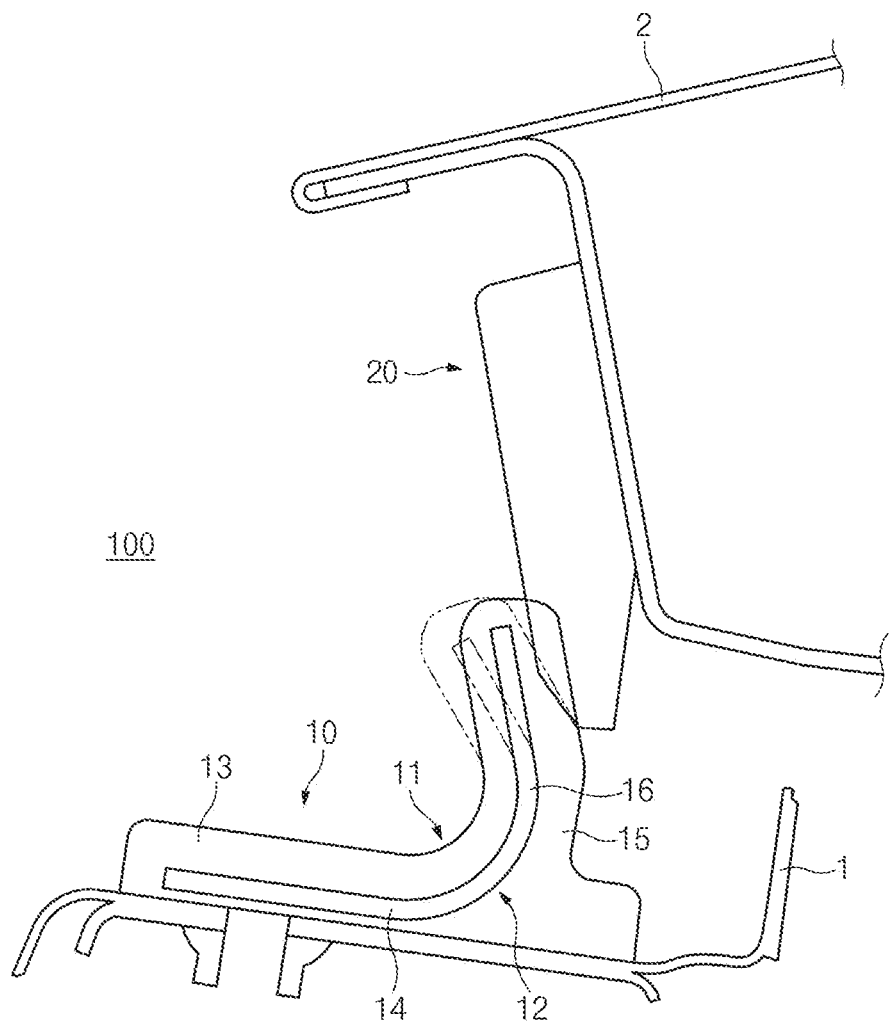
FIG. 11 illustrates a cross-sectional view of a guide bumper for a tailgate according to an exemplary embodiment of the present disclosure, in a state in which an outer guide of a first guide member is deformed as the first guide member is joined or engaged to a second guide member.

As illustrated in FIGS. 10 and 11, when the tailgate 2 closes the rear opening of the vehicle body 1, the second guide member 20 may contact the outer body 11 of the first guide member 10, and the outer body 11 may be deformed or bent by the elastic core 12 located in the inside thereof in a direction away from the second guide member 20.

According to the exemplary embodiment of the present disclosure, even if the interference distance L between the first guide member 10 and the second guide member 20 is outside a range of design (including a tolerance) due to dispersion of dimensions or tolerances in various parts of the guide bumper (the dimensions of a mounting part of the vehicle body and a mounting part of the tailgate, the dimensions of the first guide member 10 and the second guide member 20, assembly tolerances, and the like), the outer body 11 of the first guide member 10 may be elastically deformed by the elastic core 12 so that the first guide member 10 and the second guide member 20 may be tightly joined or engaged. That is, the dispersion of dimensions, tolerances, assembly tolerances, etc. of the guide bumper and its related parts may effectively be absorbed by the elastic core. Thus, the movement of the tailgate may appropriately be regulated during the running of the vehicle, thereby effectively preventing the generation of rattling noise, booming noise, etc. and making the opening and closing of the tailgate smooth.

Figure 12:
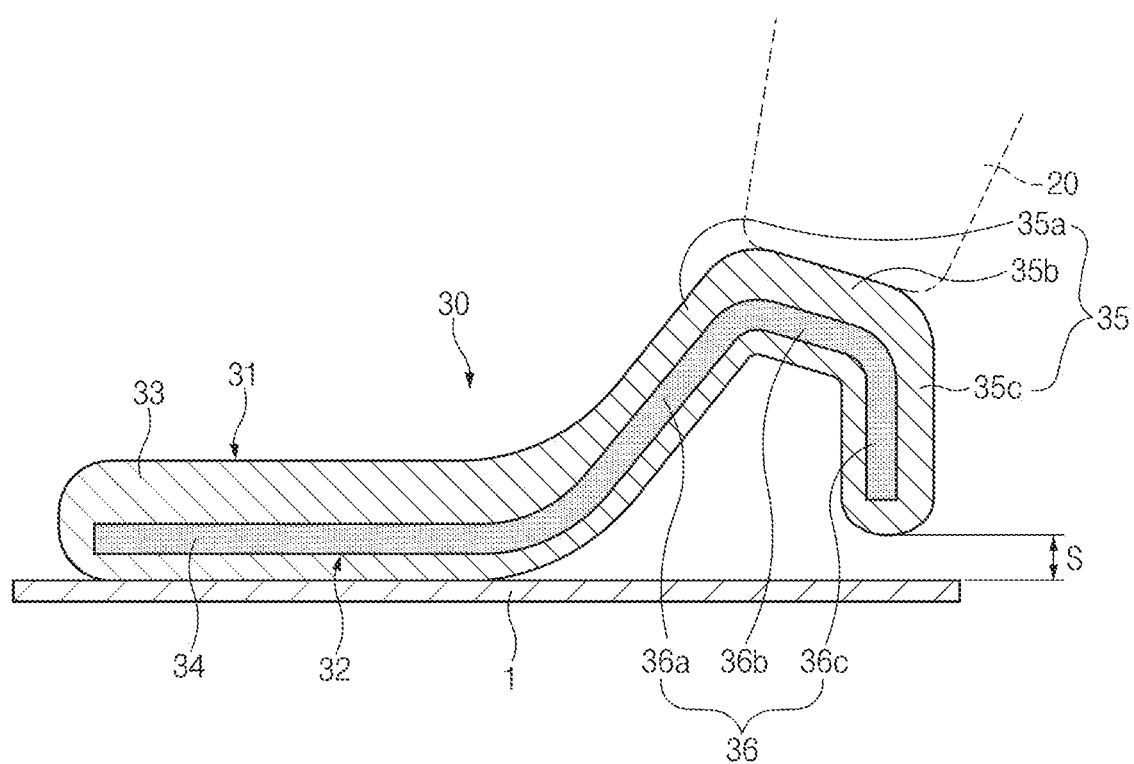
FIG. 12 illustrates a cross-sectional view of a first guide member in a guide bumper for a tailgate according to another exemplary embodiment of the present disclosure.

FIG. 12 illustrates a guide bumper for a tailgate according to another exemplary embodiment of the present disclosure. Referring to FIG. 12, a first guide member 30 may include an outer body 31 and an elastic core 32 inserted into the outer body 31.

According to an exemplary embodiment, the first guide member 30 may be mounted on a portion of the vehicle body 1 adjacent to the edge of the rear opening of the vehicle body 1, and the second guide member 20 may be mounted on the side surface of the tailgate 2.

According to another exemplary embodiment, the first guide member 30 may be mounted on the tailgate 2, and the second guide member 20 may be mounted on the vehicle body.

The first guide member 30 and the second guide member 20 may be disposed to face each other between the tailgate 2 and the rear opening of the vehicle body 1 which is opened and closed by the tailgate 2. When the tailgate 2 closes the rear opening of the vehicle body 1, the first guide member 30 and the second guide member 20 may be tightly joined or engaged to each other.

The outer body 31 may be made of an elastically deformable material such as rubber. The outer body 31 may have an outer base 33 mounted on the tailgate 2 or the vehicle body 1, and an outer guide 35 extending from the outer base 33 toward the second guide member 20.

The outer base 33 may have a shape corresponding to that of a mounting surface of the vehicle body 1, and the outer base 33 may be coupled to the mounting surface of the vehicle body 1 through fasteners or the like.

A free end of the outer guide 35 and the mounting surface of the vehicle body 1 may be spaced apart from each other by a predetermined distance S. As the second guide member 20 contacts the outer guide 35, the outer guide 35 may move along the predetermined distance S so that the outer body 31 may be elastically deformed.

The outer guide 35 may have a first outer inclined portion 35a which is inclined from the outer base 33 toward the second guide member 20, a second outer inclined portion 35b which is inclined from the first outer inclined portion 35a at a predetermined angle, and an outer vertical portion 35c which extends from the second outer inclined portion 35b in a vertical direction. A bottom end of the outer vertical portion 35c and the mounting surface of the vehicle body 1 may be spaced apart from each other by the predetermined distance s. As the outer guide 35 has the first outer inclined portion 35a, the second outer inclined portion 35b, and the outer vertical portion 35c to form a bent structure, elastic deformation of the outer guide 35 may be facilitated.

The elastic core 32 may be formed of a leaf spring. The elastic core 32 may have an inner base 34 inserted into the outer base 33, and an inner guide 36 inserted into the outer guide 35. The inner base 34 may have the same shape as that of the outer base 33, and the inner guide 36 may have the same shape as that of the outer guide 35.

The inner guide 36 may have a first inner inclined portion 36a which is inclined from the inner base 34 toward the second guide member 20, a second inner inclined portion 36b which is inclined from the first inner inclined portion 36a at a predetermined angle, and an inner vertical portion 36c which extends from the second inner inclined portion 36b in a vertical direction. As the inner guide 36 has the first inner inclined portion 36a, the second inner inclined portion 36b, and the inner vertical portion 36c to form a bent structure, elastic deformation of the inner guide 36 may be facilitated.

Figure 13:
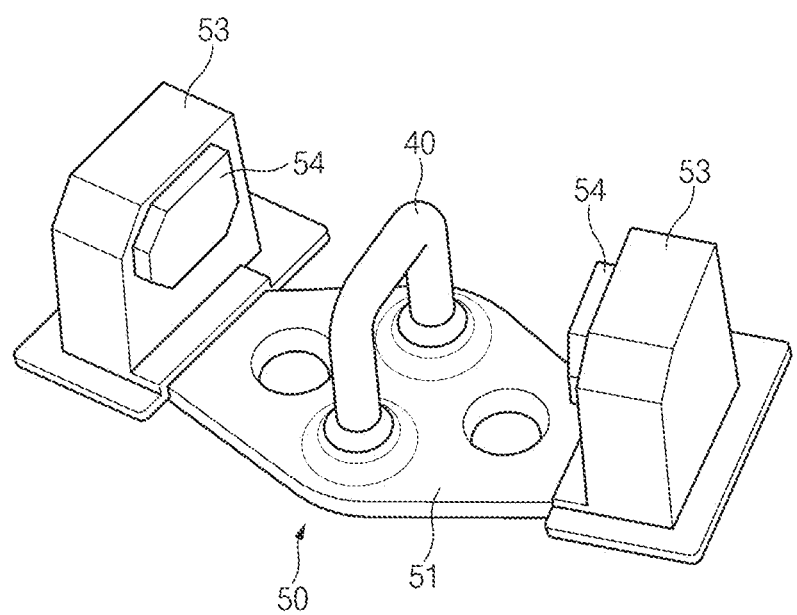
FIG. 13 illustrates a perspective view of a first guide member in a guide bumper for a tailgate according to another exemplary embodiment of the present disclosure.
Figure 14:
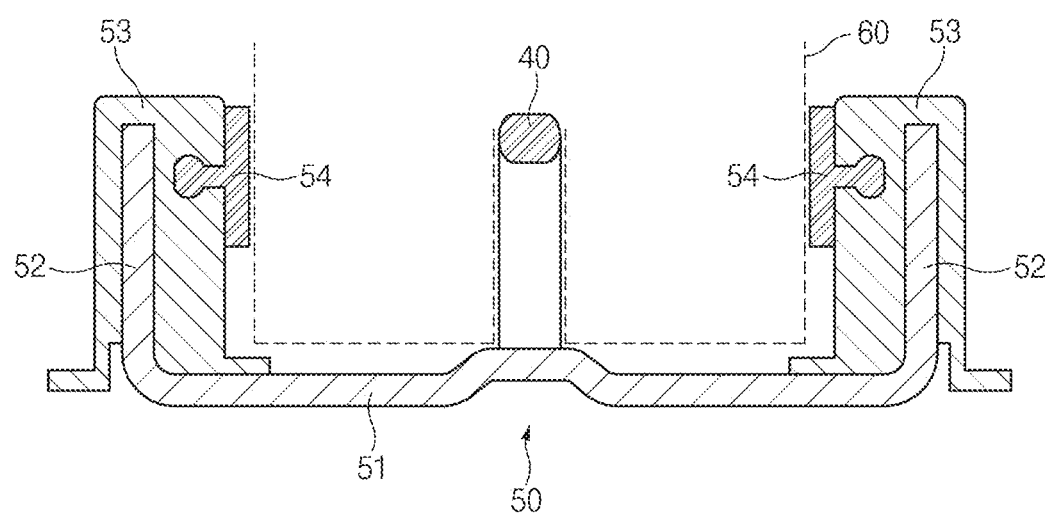
FIG. 14 illustrates a cross-sectional view of a first guide member in a guide bumper for a tailgate according to another exemplary embodiment of the present disclosure.

FIGS. 13 and 14 illustrate a guide bumper for a tailgate according to another exemplary embodiment of the present disclosure. Referring to FIGS. 13 and 14, a first guide member 50 may include a striker 40, a support body 51 supporting the striker 40, a pair of elastic cores 52 symmetrically connected to both sides of the support body 51, a pair of outer bodies 53 covering the outer surfaces of the elastic cores 52, respectively, and a pair of contact members 54 attached to the outer bodies 53, respectively.

A second guide member 60 may include a latch (not shown) which is locked or unlocked to the striker 40.

The striker 40 may be mounted on a central portion of the support body 51. That is, the support body 51 may include the striker 40.

According to an exemplary embodiment, the support body 51 of the first guide member 50 may be mounted on a portion of the vehicle body 1 adjacent to the edge of the rear opening of the vehicle body 1 through fasteners or the like, and the second guide member 60 may be mounted on the edge of the tailgate 2 through fasteners or the like.

According to another exemplary embodiment, the support body 51 of the first guide member 50 may be mounted on the edge of the tailgate 2 through fasteners or the like, and the second guide member 60 may be mounted on the portion of the vehicle body 1 adjacent to the edge of the rear opening of the vehicle body 1 through fasteners or the like.

The first guide member 50 and the second guide member 60 may be disposed to face each other between the tailgate 2 and the rear opening of the vehicle body 1 which is opened and closed by the tailgate 2. When the tailgate 2 closes the rear opening of the vehicle body 1, the first guide member 50 and the second guide member 60 may be tightly joined or engaged to each other.

In addition, when the tailgate 2 closes the rear opening of the vehicle body 1, the latch of the second guide member 60 may be locked to the striker 40 of the first guide member 50. As for the guide bumper for a tailgate according to the exemplary embodiment illustrated in FIGS. 13 and 14, a latch mechanism having the striker 40 and the latch (not shown) may be applied.

The elastic cores 52 may extend with a predetermined length from ends of the support body 51 in a vertical direction, respectively, and the elastic cores 52 may be elastically deformed outwards in relation to the support body 51. As the outer bodies 53 are coupled to cover the outer surfaces of the elastic cores 52, respectively, the outer bodies 53 may be elastically deformed by the elastic cores 52, respectively.

When the tailgate closes the rear opening of the vehicle body 1, the second guide member 60 may be inserted between the outer bodies 53, and the contact members 54 may tightly contact side surfaces of the second guide member 60, respectively.

As set forth above, the guide bumper for a tailgate, according to exemplary embodiments of the present disclosure, may allow the first guide member and the second guide member to be tightly joined or engaged by elastic deformation when the tailgate closes the rear opening of the vehicle body, regardless of dispersion of tolerances, the interference amount between the guide members, and the like, thereby reliably preventing the movement of the tailgate, rattling noise, booming noise, and the like when the vehicle is running in a state in which the tailgate closes the rear opening of the vehicle body.

According to exemplary embodiments of the present disclosure, even if the interference distance between the first guide member and the second guide member is outside a design tolerance due to the dispersion of dimensions or tolerances in the guide bumper and its related parts, the outer body of the first guide member may be elastically deformed by the elastic core so that the first guide member and the second guide member may be tightly joined or engaged. That is, the dispersion of dimensions, tolerances, assembly tolerances, etc. of the guide bumper and the related parts may effectively be absorbed by the elastic core.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A guide bumper for a tailgate, the guide bumper comprising:
   a first guide member having a first side attached to one of a vehicle body and a tailgate; and
   a second guide member configured to engage a second side of the first guide member when the tailgate is in a closed position, wherein the second side is opposite to the first side;
   wherein the first guide member includes at least one outer body and at least one elastic core fully embedded within the outer body such that the entire elastic core is fully surrounded by the outer body, wherein the elastic core allows the outer body to deform when the tailgate closes a rear opening of the vehicle body and the first guide member engages the second guide member, thereby enabling the first guide member and the second guide member to be tightly engaged;
   wherein the outer body is made of an elastically deformable material, and the elastic core is formed of a leaf spring;
   wherein the outer body includes an outer base fixedly mounted on one of the vehicle body and the tailgate, and an outer guide extending from the outer base toward the second guide member; and
   wherein the outer guide has a plurality of grooves, each of the plurality of grooves extends in a longitudinal direction of the outer guide, and the plurality of grooves are spaced apart from each other in a width direction of the outer guide.

2. The guide bumper according to claim 1, wherein the elastic core includes an inner base inserted into the outer base, and an inner guide inserted into the outer guide.

3. The guide bumper according to claim 2, wherein the outer guide intersects at a predetermined angle with respect to the outer base, and the inner guide intersects at a predetermined angle with respect to the inner base.

4. The guide bumper according to claim 3, wherein the outer body further includes an outer bending portion which is provided to be curved between the outer guide and the outer base, and the elastic core further includes an inner bending portion which is provided to be curved between the inner guide and the inner base.

5. A guide bumper for a tailgate, the guide bumper comprising:

a first guide member having a first side attached to one of a vehicle body and a tailgate; and a second guide member configured to engage a second side of the first guide member when the tailgate is in a closed position, wherein the second side is opposite to the first side;

wherein the first guide member includes at least one outer body and at least one elastic core fully embedded within the outer body such that the entire elastic core is fully surrounded by the outer body;

wherein the elastic core allows the outer body to deform when the tailgate closes a rear opening of the vehicle body and the first guide member engages the second guide member, thereby enabling the first guide member and the second guide member to be tightly engaged;

wherein the outer body is made of an elastically deformable material, the elastic core is formed of a leaf spring;

wherein the outer body includes an outer base fixedly mounted on one of the vehicle body and the tailgate, and an outer guide extending from the outer base toward the second guide member;

wherein the outer guide has a first outer inclined portion which is inclined from the outer base toward the second guide member, a second outer inclined portion which is inclined from the first outer inclined portion at a predetermined angle, and an outer vertical portion which extends from the second outer inclined portion in a vertical direction; and wherein a bottom end of the outer vertical portion and a mounting surface of the vehicle body are spaced apart from each other by a predetermined distance.

6. The guide bumper according to claim 5, wherein the inner guide has a first inner inclined portion which is inclined from the inner base toward the second guide member, a second inner inclined portion which is inclined from the first inner inclined portion at a predetermined angle, and an inner vertical portion which extends from the second inner inclined portion in a vertical direction.

7. A guide bumper for a tailgate, the guide bumper comprising:

a first guide member having a first side attached to one of a vehicle body and a tailgate; and a second guide member configured to engage a second side of the first guide member when the tailgate is in a closed position, wherein the second side is opposite to the first side;

wherein the first guide member includes at least one outer body and at least one elastic core fully embedded within the outer body such that the entire elastic core is fully surrounded by the outer body;

wherein the elastic core allows the outer body to deform when the tailgate closes a rear opening of the vehicle body and the first guide member engages the second guide member, thereby enabling the first guide member and the second guide member to be tightly engaged;

wherein the outer body is made of an elastically deformable material, the elastic core is formed of a leaf spring;

wherein the first guide member further includes a striker, and a support body supporting the striker; and wherein the elastic core is connected to the support body, and the outer body covers the elastic core.

8. The guide bumper according to claim 7, wherein the outer body has a contact member which contacts the second guide member.

\* \* \* \* \*